United States Patent [19]

Douglis et al.

[11] Patent Number: 5,481,733

[45] Date of Patent: Jan. 2, 1996

[54] METHOD FOR MANAGING THE POWER DISTRIBUTED TO A DISK DRIVE IN A LAPTOP COMPUTER

[75] Inventors: Frederick Douglis, Somerset, N.J.;
Brian D. Marsh, New York, N.Y.;
Parameshwaran Krishnan, Durham, N.C.

[73] Assignee: Panasonic Technologies, Inc., Princeton, N.J.

[21] Appl. No.: 260,104

[22] Filed: Jun. 15, 1994

[51] Int. Cl.$^6$ ................................................ G06F 1/32
[52] U.S. Cl. .............. 395/750; 364/707; 364/273.1; 364/273.2; 364/273.3; 364/236.2; 364/248.1; 364/DIG. 1
[58] Field of Search ............................ 395/750; 364/707; 307/66; 377/16; 360/73.03, 69, 71

[56] References Cited

U.S. PATENT DOCUMENTS

| | | | |
|---|---|---|---|
| 4,458,273 | 7/1984 | Johnson | 360/74.1 |
| 4,717,968 | 1/1988 | Painton et al. | 358/310 |
| 4,736,263 | 4/1988 | Takahashi et al. | 360/73.03 |
| 4,814,905 | 3/1989 | Hashimoto | 360/74.1 |
| 4,980,836 | 12/1990 | Carter et al. | 364/483 |
| 4,984,103 | 1/1991 | Nigam | 360/66 |
| 5,087,994 | 2/1992 | Fukushima | 360/73.03 |
| 5,101,311 | 3/1992 | Richmond | 360/69 |
| 5,157,560 | 10/1992 | Kanda et al. | 360/69 |
| 5,167,024 | 11/1992 | Smith et al. | 395/375 |
| 5,197,055 | 3/1993 | Hartung et al. | 369/34 |
| 5,201,059 | 4/1993 | Nguyen | 395/800 |
| 5,214,543 | 5/1993 | Takao | 360/71 |
| 5,245,595 | 9/1993 | Yasukawa | 369/32 |
| 5,246,479 | 9/1993 | Garni et al. | 360/73.03 |
| 5,265,077 | 11/1993 | Yoshimoto et al. | 369/32 |
| 5,270,992 | 12/1993 | Yasuda et al. | 369/53 |
| 5,283,702 | 2/1994 | Tsuyuguchi et al. | 360/77.04 |
| 5,289,097 | 2/1994 | Erickson et al. | 318/561 |
| 5,339,445 | 8/1994 | Gasztonyi | 395/750 |
| 5,345,347 | 9/1994 | Hopkins et al. | 360/71 |
| 5,396,635 | 3/1995 | Fung | 395/800 |
| 5,400,190 | 3/1995 | Miura | 360/69 |
| 5,412,519 | 5/1995 | Buettner et al. | 360/73.03 |
| 5,423,046 | 6/1995 | Nunnelley et al. | 395/750 |

OTHER PUBLICATIONS

Li, Kester et al., "A Quantitive Analysis of Disk Drive Power Management in Portable Computers," Computer Science Division, University of California, Berkeley, Calif. 94720.

Douglis, Fred et al., "Thwarting the Power-Hungry Disk," *1994 Winter USENIX Conference*, pp. 1–15 (Dec. 2, 1993).

Wilkes, John, "Predictive Power Conservation," *HPL-CSP-92-5*, Hewlett-Packard Laboratories (Feb. 14, 1992).

Greenwalt, Paul, "Modeling Power Management for Hard Disks," *Technical Report 93-10*, Distributed Computing Research Laboratory, Dept. of Computer Science & Engineering, University of Notre Dame, Notre Dame, Ind. 46566 (Sep. 1993).

"Kittyhawk™ Power Management Modes," *Kittyhawk™ Technical Information*, pp. 1–9 (Apr. 1993).

"Leading Capacity, Highest Performance for Notebook & Subnotebook Computers," *Quantum* brochure.

*Primary Examiner*—Gopal C. Ray
*Attorney, Agent, or Firm*—Ratner & Prestia

[57] ABSTRACT

A method for managing the power consumed by a disk drive in a portable laptop computer which includes quantizing predetermined periods of disk inactivity into states which are stored in a state table in memory. Based upon a history of disk accesses by a user, the number of transitions between each pair of states is counted and stored in memory. In view of this history, a future period of disk inactivity can be predicted and said prediction is compared with a threshold value. If the predicted period of disk inactivity is greater than the threshold value, the computer is automatically placed in a low power mode by spinning down the disk. If not, the disk continues to spin.

12 Claims, 3 Drawing Sheets

METHOD FOR MANAGING THE POWER DISTRIBUTED TO A DISK DRIVE IN A LAPTOP COMPUTER

BACKGROUND OF THE INVENTION

1. Field of the Invention

The present invention relates to a power distribution scheme in a portable computer and, more specifically, to the managing of power distributed to a disk drive in a laptop computer.

2. Prior Art

Power consumption in an electronic device is always a significant concern. A power supply must always be designed to adequately power the device, while at the same time take into consideration other related characteristics thereof, such as its heat dissipation, physical size, weight, and efficiency. These characteristics are paramount in designing or selecting an appropriate power source and become exceptionally critical when the device the power supply is to support is a self-sufficient portable unit, such as a laptop computer.

In many portable units, a self-supporting power source is used to provide the power when the unit is decoupled from its main or external power source, such as a 110 volt AC current (ordinary house current.). Typically, a battery is used to provide this independent and portable power source. In some instances, the battery functions as an auxiliary power source to maintain certain critical circuits active, such as preserving data held in a volatile memory (RAM refreshment). In other instances, the battery functions as the main power source to fully power the device.

In the area of information processing, miniaturization of processing devices has permitted the portability of computing devices. One of the first such portable processing devices developed was a hand-held calculator, wherein the calculator operated from a battery power source and could easily be carried about by the user. The battery would power all of the functions of the calculator, and the user could readily transport the calculator without any attachment to an external power source. The batteries were either replaced or recharged upon being spent. The earliest calculators simply had an on/off state which could be activated on the calculator by a user. Full power was available during the on state, and the power was completely shut off during the off state. Because of the volatile nature of many early semiconductor memories in these calculators, information stored in such volatile memories was lost when the calculator was turned off. Subsequent calculators incorporated non-volatile memory to solve this problem; alternatively, standby power was provided to such a memory when the device was turned off, so that the memory retained whatever information was stored therein. More advanced schemes were devised to monitor various functions, so that power was removed from various elements when those elements were not in use. Further, a time-out scheme was later devised to put the calculator in a standby mode, such as when a key was not depressed after a certain time period, in order to preserve power. All of these features were devised primarily to extend the time period the device could operate from its internal portable power source.

When information processing technology was expanded beyond the simple calculator to encompass personal desk top computers, additional constraints were placed upon power consumption and power management control schemes. Aside from additional circuitry included within these computers that was absent from the aforesaid calculators, additional storage devices in these computers consumed amounts of power. These memory devices included semiconductor devices, such as read-only memories (ROMs), random access memories (RAMs) (which include volatile and non-volatile memories), floppy disk drives, hard disk drives and other magnetic media. Also, additional power was required to operate the display unit in these computers which typically includes a viewing screen. Various schemes were devised to monitor and control the power distribution to these peripheral devices of a computer during on/off states.

With the advent of the portability of desk top computer systems referred to as laptops, it became desirable to provide them with fully contained, long lasting power sources. Because of their small physical size and light weight, these laptops were designed to operate only for a certain number of hours from their internal power source, i.e., typically a battery. The additional constraints imposed on desk top computers were also placed upon these laptops which contained additional circuitry, memory, viewing screens and peripheral devices attached thereto. These devices necessarily consumed additional power. In order to extend the self-sustaining time period of these laptops while keeping the battery size and weight to a minimum, a sophisticated power management scheme was essential to provide power only to those circuits and devices which required such power and to remove such power, or at least to make a given device enter a low power consumption mode, when that device was inactive. The management scheme also had to continually monitor the various circuits and devices in order that power could be applied immediately to activate such circuits and devices only when needed.

With the increasing popularity of portable laptop computers, and the industry goal to further miniaturize laptop components while enlarging memory size and laptop functions, power management of laptop system components became increasingly more important and a significant problem in the art. Table 1 below gives a listing of major laptop system components and their power consumption in a typical portable computer as measured by those skilled in the art.

TABLE 1

| Breakdown of power consumption by components. | | | |
|---|---|---|---|
| Component | Manufacturer & Model | Power (watts) | Percent of Total |
| Display | Compaq monochrome lite25c | 3.5 | 68% |
| Disk Drive (105 Mbytes) | Maxtor MXL-105 III | 1.0 | 20% |
| CPU | 3.3V Intel486 | 0.6 | 12% |
| Memory (16 Mbytes) | Micron MT4C4M4A1/B1 | 0.024 | 0.5% |

At 68%, the display clearly dominates the system power consumption. The disk drive represents 20% of the power consumption in a portable computer. The disk thus became a clear candidate for power management because it is a device, unlike the display, with which the user does not interact directly. With proper management by the operating system, the disk may be spun up when accessed and spun down during long periods of inactivity without the user noticing much difference in performance or reliability of the system.

The recent explosion in the portable computer market enticed disk drive manufacturers to develop a special breed of disk drives especially designed for the portable environment. In addition to high shock tolerances, reduced physical volume, and smaller weights, these drives consume less energy and more importantly have a new mode of operation, often called SLEEP mode.

SLEEP mode (a low power mode) is when the disk is powered up, but the physical disk platter is not spinning. The SLEEP mode (a high power mode) is distinguishable from IDLE mode wherein the disk is spinning but there is an absence of disk activity. ACTIVE mode (also a high power mode) is different from the SLEEP and IDLE modes in that when the disk platter is spinning, either the disk head is seeking or it is actively reading from or writing onto the disk. OFF mode is when the disk consumes no energy and performs no function except power up. Table 2 shows the power consumed by a typical disk drive as determined by those skilled in the art. Table 3 shows the transition times between disk modes and their power consumptions for a sample disk drive as determined by those skilled in the art.

TABLE 2

Power consumption of the major disk modes for the Maxtor MXL-105 III.

| Mode | Power (watts) |
| --- | --- |
| OFF | 0.0 |
| SLEEP | 0.025 |
| IDLE | 1.0 |
| ACTIVE | 1.95 |

TABLE 3

Average transition times between major disk modes and their power consumptions for the Maxtor MXL-105 III.

| Transition | Time (seconds) | Power (watts) |
| --- | --- | --- |
| POWERUP | 0.5 | 0.025 |
| SPINUP | 2.0 | 3.0 |
| SEEK | 0.009 | 1.95 |
| SPINDOWN | 1.0 | 0.025 |
| POWERDOWN | 0.5 | N/A |

A very significant portion of the energy consumed by a disk drive is spent in preserving the angular momentum of the physical disk platter. A much smaller fraction is spent in powering the electrical components of the drive. By sleeping, a drive can reduce its energy consumption to near zero by allowing the disk platter to spin down to a resting state. This is aptly called spinning down the disk. This substantial energy reduction, however, is not without its costs. An access to a disk while it is sleeping incurs a delay measured in seconds as opposed to the tens of milliseconds required for an access to a spinning disk. If the disk drive is powered up and used with any frequency (multiple accesses), it will have a significant impact on the length of time the computer can operate on a single battery charge.

There is a large difference in power consumption between a disk that is spinning and one that is not. So systems try to keep the disk spinning only when they must. To get some idea of how the disk can affect battery life, power consumption of a disk on a Dell 320 SLi, a Toshiba T3300SL and a Zenith Mastersport SLe was measured by those skilled in the art. This data is shown in Table 4 below.

TABLE 4

| | Power measurements of three typical laptop computers. | | | | | |
| --- | --- | --- | --- | --- | --- | --- |
| Machine | CPU Speed (MHz) | Disk Size (MBytes) | Disk State | System Power (W) | Power Savings (W) | % of Total System Power |
| Zenith Mastersport SLe | 25.0 | 85 | Idle | 10.5 | 1.0 | 9.5 |
| | | | Stopped | 9.5 | | |
| | 6.5 | | Idle | 9.2 | 0.9 | 9.8 |
| | | | Stopped | 8.3 | | |
| Toshiba T3300SL | 25.0 | 120 | Idle | 8.1 | 1.2 | 14.8 |
| | | | Stopped | 6.9 | | |
| | 6.5 | | Idle | 7.3 | 1.1 | 15.1 |
| | | | Stopped | 6.2 | | |
| Dell 320SLi | 20.0 | 120 | Idle | 4.5 | 0.9 | 20.0 |
| | | | Stopped | 3.6 | | |
| | 2.5 | | Idle | 3.2 | 1.0 | 31.2 |
| | | | Stopped | 2.2 | | |

All three machines were running Mach 3.0 (UX37/MK 77). The machines are listed in the relative order of their age. At the time they were purchased, they represented the state of the art in low power notebook design. All three used the Intel SL Superset, which consists of the 386 SL CPU and the 82360 I/O controller. The Zenith and Toshiba both have a backlit LCD display, while the Dell uses a "triple super-twist nematic, reflective LCD" display. The following parameters were varied in these machines: the speed of the CPU, and the state of the disk. These parameters were controlled using hot-key bindings supplied by the system manufacturers. The CPU speed was set at the fastest and slowest speeds available; the disk was set to be either "spun-up" or "spun-down".

Varying the CPU clock speed was important because the CPU can consume a large amount of power. Reducing its clock speed when there is no work to be done can significantly reduce the amount of power consumed. Mobile computers are likely to be used for highly interactive software (such as mailers, news readers, editors, etc.). So it is reasonable to expect a large amount of CPU idle time. When the CPU clock speed is reduced, a spinning disk will consume proportionally more of the total system power than when clock speed is increased.

Looking at Table 4 above, it is noted that disk densities are increasing, making it possible to carry more data. Machines are now available with even larger disks than the systems noted above. Even though disk densities have increased, the power used by the largest disks has stayed about the same, around 1 W for an idle spinning disk. Next, the overall system power cost is dropping. The result is that the amount of power consumed by the disk subsystem on these notebook computers has increased from 9% to 31%. Improved recording densities make it possible to store more data on the same physical device, but they do not affect the physical mass. Drives are becoming more efficient, but cost about the same to spin-up and to keep spinning. Theoretically, machines could have smaller disks, but in practice, higher recording densities are used to increase the overall capacity of the storage system instead of decreasing its power consumption. With the exception of the smallest and lightest computers, such as the Hewlett-Packard Omnibook, the trend seems to be to carry a larger disk with the same mass rather than a smaller disk with the same number of bytes.

Based on Table 4, proper disk management can not only improve battery life, but can also provide a competitive advantage to one laptop over another. For instance, battery life for the Dell 320 could be improved 20 to 31%, the amount that could be saved if the disk were made inactive when not needed. Put another way, a battery that lasts 5 hours could last from 6 to 6.5 hours with proper power management. Of course, turning the disk off can result in increased access latency. After the disk is turned off, additional power will be consumed at start up, i.e. each time the disk is spun-up. The system must, therefore, trade off between the power that can be saved by spinning the disk down quickly after each access and the impact on response time (including additional power consumed) from spinning it down and then up again too often.

Current laptop computers implement a number of power reduction techniques to achieve longer battery life. Most, if not all, current mobile computers use a fixed threshold to determine when to spin down the disk: if the disk has been idle for some (predetermined) amount of time, the disk is automatically spun down. The disk is spun up again upon the next access. The fixed threshold is typically on the order of many seconds or minutes to minimize the delay from on demand disk spin-ups. The Hewlett-Packard Kittyhawk C3014A spins down and up again in about 3 seconds, and its manufacturer recommends spinning it down after about 5 seconds of inactivity; most other disks take several seconds for spin-down/spin-up and are recommended to spin down only after a period of minutes. In fact, spinning the disk for just a few seconds without accessing it can consume more power than spinning it down and up again upon the next access. Spinning down the disk more aggressively may therefore reduce the power consumption of the disk, in exchange for higher latency upon the first access after the disk has been spun down.

In Table 5 below, last entry, $T_d$ is a break even point where the cost to keep the disk spinning equals the cost in spinning it down immediately and then up again just prior to the next access. In other words, if the next access is likely to be more than $T_d$ seconds in the future, the disk should be spun down and up again prior to the next access instead of continually spinning the disk in order to consume less power and preserve battery life. With future knowledge of disk activity, one can spin down the disk immediately if the next access will take place more than $T_d$ seconds in the future. This will result in minimal power consumption and maximum power conservation. There are, of course, complications beyond the simple threshold; for instance, (a) a disk usually has multiple states that consume decreasing amounts of power, but from which it is increasingly costly (in time and power) to return to the active state (for example, when the disk is spinning but the disk head is parked), (b) the time of the next access is usually unpredictable, giving credence to a conservative spin-down approach, and (c) response time (spin up latency) will be adversely affected. Table 5 lists the characteristics of two disk drives for mobile computers, the Hewlett-Packard Kittyhawk C3014A and the Quantum Go-Drive 120, including values for $T_d$.

TABLE 5

Disk characteristics of the Kittyhawk C3014A and Quantum Go*Drive 120.

| Characteristic | Hewlett-Packard Kittyhawk C3014A | Quantum Go*Drive 120 |
|---|---|---|
| Capacity (Mbytes) | 40 | 120 |
| Power consumed, active, (W) | 1.5 | 1.7 |
| Power consumed, idle, (W) | 0.6 | 1.0 |
| Power consumed, spin up (W) | 2.2 | 5.5 |
| Normal time to spin up (s) | 1.1 | 2.5 |
| Normal time to spin down (s) | 0.5 | 6.0 |
| Avg time to read 1 Kbyte (ms) | 22.5 | 26.7 |
| Break-even interarrival time $T_d$ (s) | 5.0 | 14.9 |

The time to spin up the disk once a new request arrives has a substantial impact on response time. An on-line approach that spins up the disk when a request arrives if the disk has been spun down will cause the request to wait until the disk is ready, typically at least one-two seconds. This latency is up to a couple of orders of magnitude greater than normal disk access times, and should be avoided whenever possible. The high spin-up overhead is the reason why typical thresholds for spinning down a disk are often on the order of several minutes, even if $T_d$ is just a few seconds. If the disk has not been accessed for several minutes, then the overhead of a couple of extra seconds before a new request can be serviced is neither unexpected nor unreasonable.

Industry has taken the approach of a shutdown of system components as a major power management technique. This approach works well when there are clear periods of system inactivity, but fails on the more typical scattered activity patterns. This invention takes into account these scattered activity patterns and provides power conservation in view thereof.

3. Prior Art References

A number of prior art references are known for controlling the consumption of power to a device or to a portion of a device, including a means of providing a time-out when user interaction has not occurred for a given time period. However, these references fail to disclose the sophisticated disk power management scheme for a laptop computer of the present invention. The references are:

Article entitled "Predictive Power Conservation Kittyhawk Power Management Modes" by Wilkes. This article describes a disk spin-down system which sets a threshold time limit for spin-down based on past performance (few immediately prior intervals).

U.S. Pat. No. 5,201,059, issued Apr. 6, 1993, for a Method For Reducing Power Consumption . . . " in which a periodic keyboard polling interrupt is monitored to determine whether a computer is idle and may be powered down.

U.S. Pat. No. 5,197,055, issued Mar. 23, 1993, for an "Idle Demount in an Automated Storage Library" which relates to an automated storage library in which a disk is demounted or spun down on a least-recently-used basis, if the drive has been inactive for a minimum threshold time.

U.S. Pat. No. 4,984,103, issued Jan. 8, 1991, for a "Method for Reading/Writing for a Floppy Disk Drive with Buffer Memory," in which to minimize spin-ups of a disk drive, a disk cache stores more information than is requested by a particular access, and then the disk is spun down, not to spin up again until it receives a request for information which is not in the disk buffer.

U.S. Pat. No. 5,157,560, issued Oct. 20, 1992, for "Data Recording and Reproducing Device Designed to Reduce Power Consumption," which device conserves power by applying it to only one of the spindle motor and the voice coil motor at any given time.

U.S. Pat. No. 5,167,024, issued Nov. 24, 1992, for "Power Management for a Laptop Computer with Slow and Sleep Modes" in which a laptop computer enters a low power activity in SLEEP mode (the system also has an intermediate power mode in which a slow clock speed is used during periods of inactivity before the fixed time has elapsed).

Specification entitled *Kittyhawk Technical Information*, dated April 1993, which describes a disk drive which has several power-saving operational modes and which can respond to commands to go from an active mode to a standby mode (electronics are active but disk is spun down) to a sleep mode. A five second threshold is suggested to go from active to standby mode.

Based on the above material, one of the objects of the present invention is to provide a power conservation method for a disk drive in a laptop computer which conserves power while taking into account other related characteristics of the computer device such as heat dissipation, physical size, weight and efficiency thereof.

Another object of the present invention is to provide an efficient disk power management system for a laptop computer to extend the time the computer can operate on a battery charge by reducing the amount of power used by the disk drive.

A further object of the present invention is to provide a power conservation method for a laptop computer in light of the additional circuitry and memory devices used therein and the power consumed by those devices.

A still further object of the present invention is to extend the life of a power supply used in a portable computer while keeping the size and weight of such device and power supply to a minimum.

Another object of the present invention is to provide a power supply management scheme which permits monitoring of the various circuits and peripheral devices attached to or contained in the portable computer.

An object of the present invention is to prevent or minimize a delay in the access time to the disk by a user.

A further object of the present invention is to provide an efficient power conservation scheme for a laptop computer which balances the power that can be saved by spinning a disk down quickly after each access and the impact of spin down on response time when disk access is requested, causing the disk to spin up again.

A still further object of the present invention is to conserve the power in a laptop computer by spinning down the disk immediately when there is inactivity if the next access will likely occur more than $T_d$ seconds in the future, i.e. the next access will likely occur far enough in the future for the system to save power by spinning down the disk.

Another object of the present invention is to take into account the following factors in disk power management: spin up latency (the time it takes a user to access a disk that has already been spun down); predictability of the next access to the disk (the likelihood of when the next disk request will be made by a user); and all intermediate states of disk activity.

SUMMARY OF THE INVENTION

The present invention relates to a power conservation system for a laptop computer. This power system spins down a hard disk drive when it is unlikely to be accessed in the near future. The decision to spin down the disk is made by a computer in response to past history of disk activity. A prediction is made of the next disk access, based on the past history of disk activity, such that spin down of the disk occurs earlier than would normally occur under a fixed threshold power conservation scheme. By stopping the disk from spinning, battery power or a single battery charge is conserved and laptop computer operation time is extended.

The inventive method uses a Markov chain to model the operation of a disk drive. The model defines multiple states, each corresponding to a respectively different time duration between successive disk accesses. A frequency of distribution table is generated for the Markov chain by monitoring state changes based on the actual operation of the disk drive, i.e. history of state changes is derived. When a set number of events has been monitored, the system shifts to an operational mode in which the frequency distribution is used as a probability distribution to predict the next state (i.e., the time interval to the next disk access) based on the time interval since the last disk access.

If the most probable time for the next disk access is greater than a threshold time value, $T_d$, (at which the cost (power consumption) of spinning the disk down and then up again at the next disk access is less than continuing to spin the disk), the disk drive is spun down immediately. If the most probable time until the next access is less than the threshold value, $T_d$, the disk continues to spin. If the system has been idle for more than a second threshold time value, the disk is spun down without reference to the probability distribution. This power conservation system may be switched in and out by the user via a "power saver" switch. The switch may be implemented either in hardware or software. The user may even override the system when desired (e.g. when system parameters change).

The inventive method includes the steps of quantizing the periods of inactivity for the disk into a plurality of states, each representing a distinct range of time duration periods, monitoring the equipment while it is operating to obtain statistics on transitions between the plurality of states, determining and storing a value representing each inactive time interval as it occurs, predicting a next inactive time interval based on the stored values, and placing the equipment in the low power mode only if the predicted duration of inactivity is greater than a predetermined threshold value, $T_d$.

Other objects and a fuller understanding of this invention may be had by referring to the following description and claims, taken in conjunction with the accompanying drawings noted below.

DETAILED DESCRIPTION OF THE PRESENT INVENTION

Figure 1:
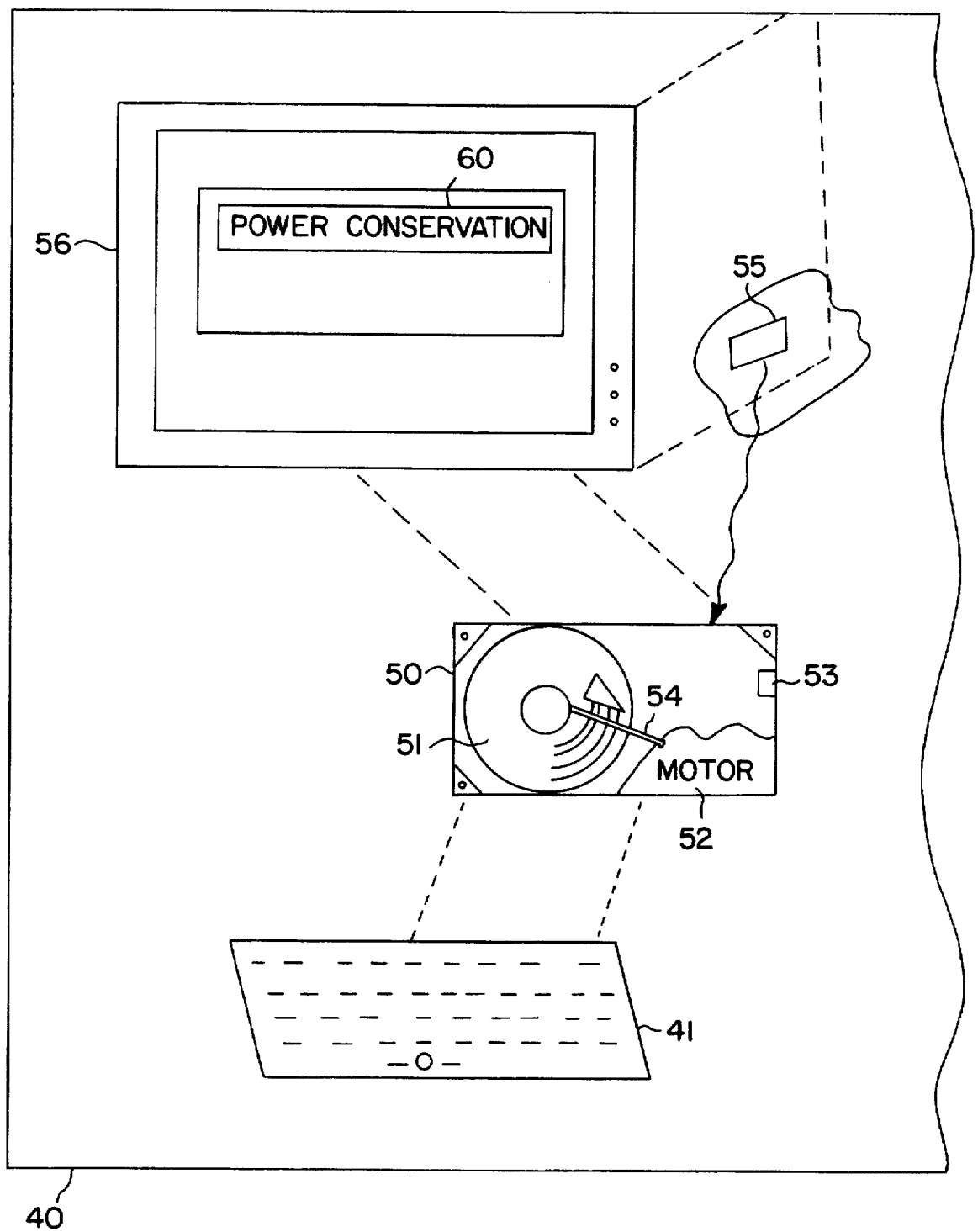
FIG. 1 is a diagram of the system components of a laptop computer with disk drive.

FIG. 1 depicts hardware components used with the subject invention. A laptop computer 40 contains a keyboard 41 for inserting information or commands into the computer. A housing 50 is provided within the computer 40 for housing the disk 51 which is capable of spinning. Connected to the disk 51 is a motor arm 54 for spinning the disk 51. Arm 54 is also connected to a motor 52 which drives the arm 54. Also included within the housing 50 is a power saver switch 53 which may be activated by a user. Switch 53 has an ON and OFF position. The user of the computer need only turn switch 53 to its ON position to activate the power conservation scheme. If switched to its OFF position, the user is overriding the software driven power conservation scheme.

Figure 2:
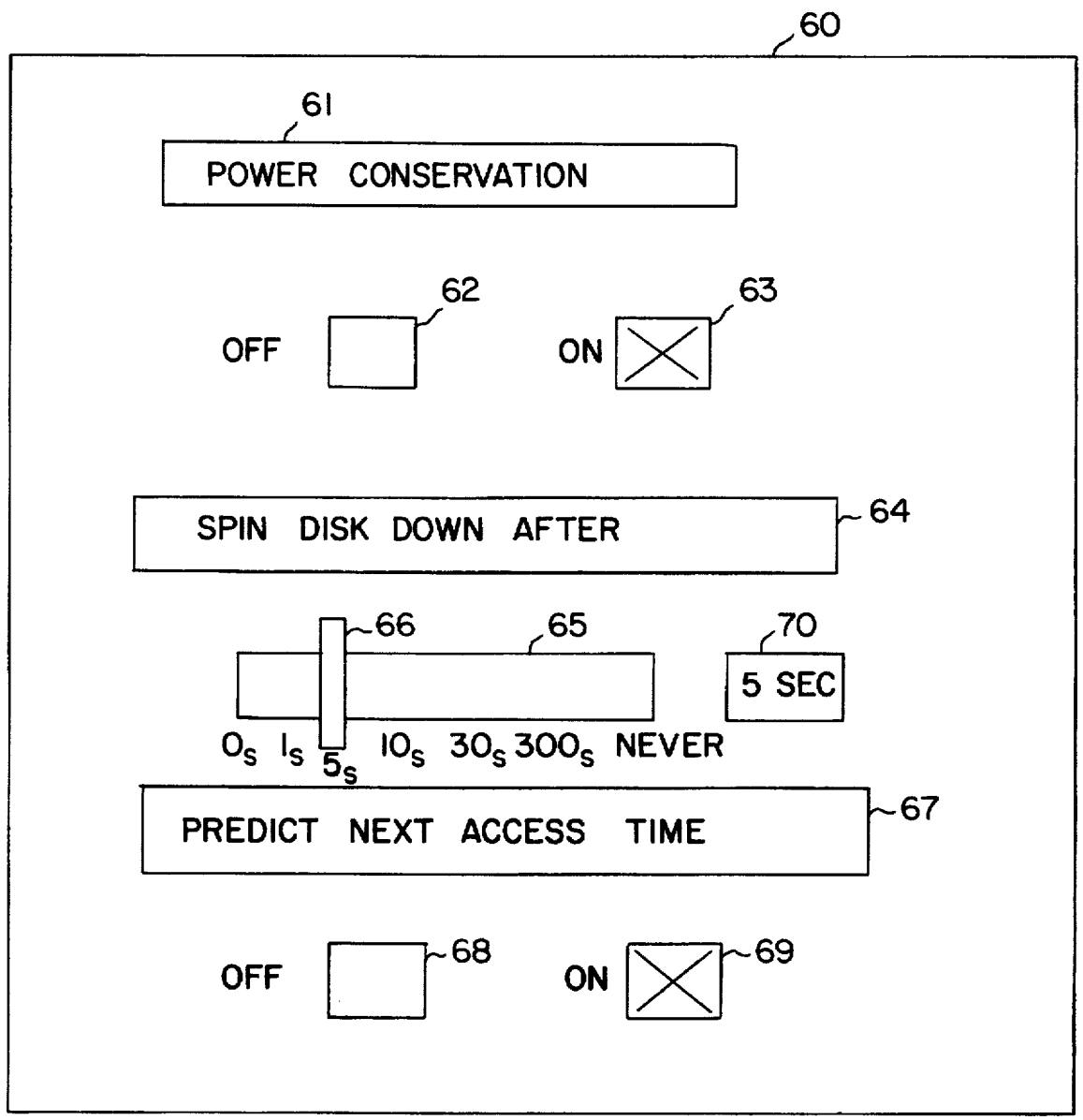
FIG. 2 is a diagram of a laptop computer display of a power conservation menu.

The laptop computer 40 also includes a display 56 housing a screen 60 and an operating system 55. The operating system 55 contains a routine which automatically implements the power conservation scheme of the present invention. The computer user may also implement this power conservation scheme by typing in a command as shown on screen 60 in FIG. 2. On the first line of the screen appears the title of the routine, called Power Conservation, which the user may activate. The user may key in or override the power conservation scheme by activating on line 2 of the screen, box 62, the OFF instruction, or box 63, the ON instruction. In FIG. 2, line 2, box 63, with an "X" contained therein, indicates that the power conservation scheme is being employed by the user. Line 3 of screen 60 indicates that the disk 51 is to be spun down after the number of seconds indicated on the horizontal time scale 65 shown on line 4 of screen 60. A slider arm 66 is movable along scale 65 to identify the temporal period in seconds after which the disk is to be spun down. This temporal period acts as a second threshold to spin the disk down as will be hereinafter explained. Thus, the second threshold is adjustable depending on the user's needs and desires. A digital representation of this time period is displayed on line 4 of screen 60 at box 70. In FIG. 2, this time period is set at 5 seconds. Line 5 on screen 60 contains a box 67 which contains the statement "Predict Next Access Time." When the user desires the system to make a prediction of the next time the disk will be accessed, he activates box 69, the "ON" box. Otherwise, he activates the OFF box 68 to prevent the prediction from being made.

Figure 3:
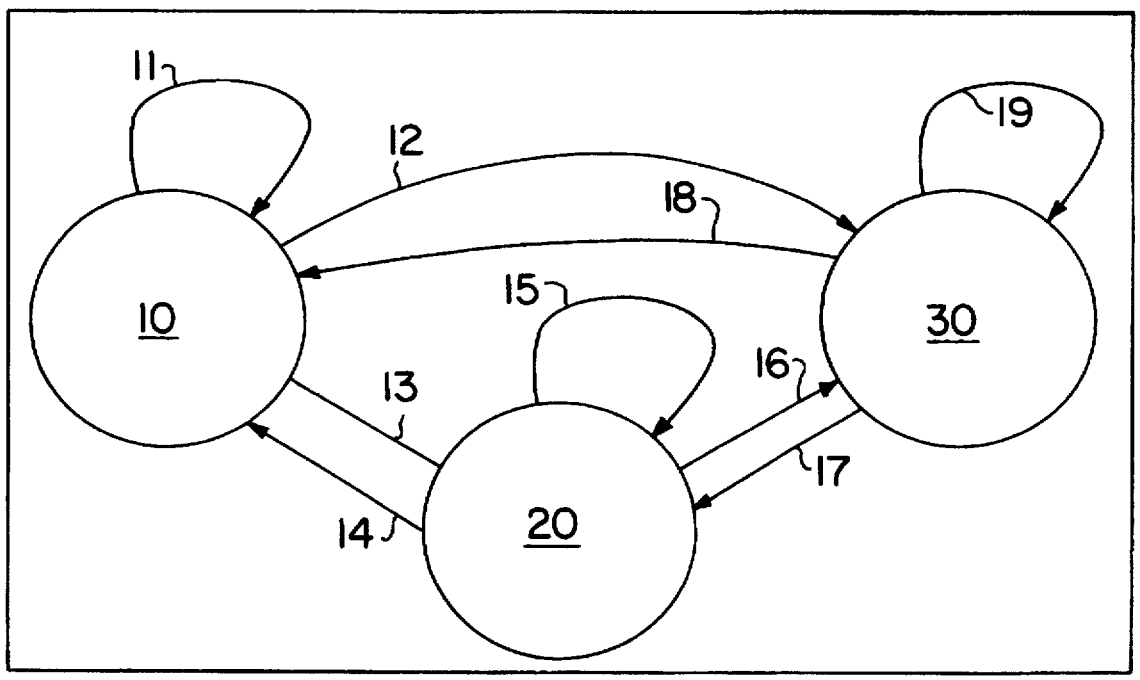
FIG. 3 is a state transition diagram showing a Markov chain with three states and probability transitions therebetween represented by arrows.

A Markov chain is used to anticipate when the next request will be made upon a disk. The Markov chain corresponds to the most recent interarrival time, i.e., time between last two disk accesses, at the disk. The Markov chain is described by a set of states with probabilities of transition between states. FIG. 3 shows a sample Markov chain with three states: 10, 20 and 30. The arrows represent the transitions between states. For example, for state 10, there are three state change possibilities. State 10 can transition to itself, shown by reference numeral 11; it can transition to state 30, shown by reference numeral 12; or it can transition to state 20, shown by reference numeral 13. Similarly, state 20 can transition to state 10, as shown by reference numeral 14; it can transition to itself, as shown by reference numeral 15; or it can transition to state 30, as shown by reference numeral 16. Likewise, state 30 can transition to state 20, as shown by reference numeral 17; it can transition to state 10, as shown by reference numeral 18; or it can transition to itself, as shown by reference numeral 19.

Table 6 below contains the probabilities of each transition from one state to another.

TABLE 6

| Probabilities of State Transitions | | | |
|---|---|---|---|
| From State | To State | | |
| | 10 | 20 | 30 |
| 10 | .80 | .15 | .05 |
| 20 | .50 | .25 | .25 |
| 30 | .10 | .20 | .70 |

The reference numerals correspond with each probability of transition between states as follows. For example, reference numeral 11 represents an 80% probability that state 10 will transition to itself; reference numeral 12 represents a 5% probability that state 10 will transition to state 30; reference numeral 13 represents a 15% probability that state 10 will transition to state 20; reference numeral 14 represents a 50% probability that state 20 will transition to state 10; and reference numeral 15 represents a 25% probability that state 20 will transition to itself; reference numeral 16 represents a 25% probability that state 20 will transition to state 30; reference numeral 17 represents a 20% probability that state 30 will transition to state 20; reference numeral 18 represents a 10% probability that state 30 will transition to state 10; and reference numeral 19 represents a 70% probability that state 30 will transition to itself.

Thus, if at time t, the Markov chain is at state 20, at time t+1, it is 25% likely to remain in state 20, 50% likely to transition to state 10, and 25% likely to transition to state 30.

Each state in the Markov chain corresponds to a predetermined range of times between successive disk accesses and may correspond to the most recent interarrival time at the disk, i.e., the time between two most recent disk accesses. If the next access is predicted to occur more than $T_d$ seconds in the future, the disk is spun down immediately. The disk is spun up again upon the next disk access. This is called a Predictive-Demand model. More elaborate chains can use more than one recent interarrival time to predict the next access. These chains can also use predicted interarrival times to spin up the disk in advance of the next access. The predicted interarrival time may also be variable depending upon predicted battery life.

One way to implement in hardware the Markov chain model for predictive spin-down is to utilize memory to categorize times between disk accesses into buckets, which are ranges of possible access times. Buckets correspond to the states referred to above and as shown in FIG. 1. Table 7 below gives an example of buckets (states) which are placed in a table in computer memory.

TABLE 7

Buckets for predictive spin access. Times are in seconds.

| Bucket | Start | End |
|---|---|---|
| 0 | >0.000 | 0.100 |
| 1 | >0.100 | 0.250 |
| 2 | >0.250 | 0.500 |
| 3 | >0.500 | 1.000 |
| 4 | >1.000 | 2.000 |
| 5 | >2.000 | 3.000 |
| 6 | >3.000 | 5.000 |
| 7 | >5.000 | 100.000 |
| 8 | >100.000 | ∞ |

Based on this Table 7, an interarrival time of 1.5 seconds corresponds to bucket number 4. If $T_d$ has been previously computed to be 5 seconds, the disk should not be spun down for any accesses for which the interarrival time falls into buckets 0–6. Spinning the disk down immediately when the upcoming interarrival time between disk accesses falls in a higher bucket, however, will save energy, despite the fact that there will be degradation in response time to the next request for disk access. This degradation in performance can be eliminated or minimized if the disk can be spun up prior to the next disk access based upon the prediction of the time to the next disk access.

The Markov chain model is built up over time by storing a count of the number of transitions between each pair of buckets (states). An example of a transition matrix appears in Table 8.

TABLE 8

Transition tables corresponding to the buckets in Table 7.

| Bucket | 0 | 1 | 2 | 3 | 4 | 5 | 6 | 7 | 8 |
|---|---|---|---|---|---|---|---|---|---|
| 0 | 4905 | 443 | 193 | 135 | 142 | 95 | 132 | 32 | 0 |
| 1 | 416 | 131 | 51 | 38 | 55 | 21 | 33 | 13 | 0 |
| 2 | 178 | 49 | 19 | 29 | 48 | 25 | 33 | 6 | 0 |
| 3 | 141 | 38 | 29 | 19 | 36 | 18 | 45 | 3 | 0 |
| 4 | 176 | 36 | 41 | 40 | 33 | 16 | 56 | 8 | 0 |
| 5 | 93 | 17 | 12 | 25 | 19 | 6 | 76 | 14 | 0 |
| 6 | 142 | 34 | 38 | 38 | 61 | 77 | 47 | 1140 | 0 |
| 7 | 26 | 10 | 5 | 5 | 11 | 4 | 62 | 35 | 0 |
| 8 | 0 | 0 | 0 | 0 | 0 | 0 | 0 | 0 | 0 |

This matrix is a possible transition matrix. The most transitions are between bucket 0 and itself, which strongly suggests that if the last access came within 100 milliseconds of the preceding access, the disk should not be spun down. It is not so intuitive, however, that bucket 6 transitions most often to bucket 7, i.e., if the last access came between 3 and 5 seconds after the preceding access, the next access is likely to come between 5–100 seconds, so the disk should be spun down immediately.

The rationale behind having many buckets is that with more buckets there is a stronger likelihood of making a more accurate prediction. The specific number of buckets and the ranges for each bucket should be tuned to a particular system based on disk parameters, predicted battery life, application mix, programs being run, etc.

One problem that is addressed by the subject invention is what to do if the prediction of next access or interarrival time is incorrect. If the prediction of next disk access or interarrival time indicates that the disk should be spun down, and contrarily an access occurs in less than $T_d$ seconds, the remedy is simple: the disk is spun up again upon request. But if the prediction causes the disk to remain spinning, yet no access occurs, leaving the disk spinning indefinitely will consume too much power, rendering the whole procedure useless. To avoid this problem, the subject invention uses a second threshold: if the disk has not been spun down by virtue of a prediction and a predetermined time elapses without an access, the disk is automatically spun down. In addition to the second threshold, the computer user may override the power conservation scheme by activating the OFF box 62 in FIG. 2. This may occur, for example, when the computer is plugged in and not operating upon the battery power source.

In view of the fact that computer systems use different components and software and have different $T_d$ values, such as is shown in Table 5 above, the subject invention is adaptable and can change the bucket and/or derived transition tables when another computer, new system components, new operating system, etc. are in use. In other words, this invention is adaptable to different system parameters and multiple disk drives.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed:

1. A power conservation method for a computer apparatus that includes a memory and that contains a spinnable disk that exhibits intermittent periods of activity separated by periods of inactivity wherein said computer apparatus is in a high power consumption state or a low power consumption state lower than said high power consumption state and wherein periods of disk activity always take place when said computer apparatus is in said high power consumption state and periods of disk inactivity take place when said computer apparatus is in either said high power consumption state or said low power consumption state, the method including the steps of:

quantizing predetermined periods of disk inactivity into a plurality of states, each said state representing a distinct range of time;

storing in a table in said memory counts of a number of transitions between each pair of states while said apparatus has been in operation for a given period of time;

predicting a time period of disk inactivity based upon a historical review of the previously stored counts for each pair of states;

determining that said disk is in said predicted time period of disk inactivity; and placing the computer apparatus in said low power consumption state if power expenditure by said computer apparatus in said high power consumption state during the predicted time period of disk inactivity is determined to be greater than power expenditure by said computer apparatus between two periods of disk activity with an intervening one of said periods of disk inactivity.

2. The method of claim 1 further including the step of:

continuing to maintain the computer apparatus in said high power consumption state if power expenditure by said computer apparatus in said high power consumption state during the predicted period of disk inactivity is less than power expenditure by said computer apparatus between said two periods of disk activity with said intervening one of said periods of disk inactivity.

3. The method of claim 2 further including the step of:

changing the table of the number of transitions between each pair of states based on a change in the computer apparatus.

4. The method of claim 2, wherein said method is for a plurality of spinnable disks further including the step of:

storing a plurality of tables in said memory of the number of transitions between each pair of states, each table pertaining to a respective one of said plurality of spinnable disks.

5. The method of claim 4 further including the step of:

changing each of said plurality of tables responsive to a change in operating systems executing in said computer apparatus.

6. A power conservation method according to claim 2, wherein said periods of disk activity with said intervening one of said periods of disk inactivity includes said computer apparatus a) first transitioning to the low power consumption state at the beginning of the predicted time period of disk inactivity, b) second transitioning back to the high power consumption state at the end of the predicted time period of disk inactivity and c) remaining in the lower power consumption state between the first and second transitioning.

7. The method of claim 1 further including the step of:

storing said states into a table in said memory associated with said apparatus.

8. The method of claim 1 further including the step of:

storing said predictions into a table in said memory.

9. The method of claim 1 further including the step of:

storing in said memory a predetermined threshold value which when exceeded by a period of disk inactivity overrides placing the computer in said low power consumption state regardless of the predicted period of disk inactivity.

10. The method of claim 1 further including the step of:

switching the apparatus from said low power consumption state to said high power consumption state in which said disk continues to spin as desired by a user regardless of the predicted period of disk inactivity.

11. The method of claim 1 further including the step of:

spinning-up the disk prior to the next disk access based upon a prediction of when the next disk access will occur.

12. A power conservation method according to claim 1, wherein said computer apparatus transitions between said two periods of disk activity with said intervening one of said periods of disk activity by a) first transitioning to the low power consumption state at the beginning of the predicted time period of disk inactivity, b) second transitioning back to the high power consumption state at the end of the predicted time period of disk inactivity and c) remaining in the lower power consumption state between the first and second transitioning.

* * * * *

UNITED STATES PATENT AND TRADEMARK OFFICE
CERTIFICATE OF CORRECTION

PATENT NO. : 5,481,733
DATED : January 2, 1996
INVENTOR(S) : Frederick Douglis, Brian D. Marsh, and Parameshwaran Krishman It is certified that error appears in the above-indentified patent and that said Letters Patent is hereby corrected as shown below:

Column 1, line 27, after "house current" delete --.--.

Column 1, line 53, after "information was" insert --stored therein. More advanced schemes were devised to--.

Delete column 1, line 67.

Column 3, line 20, after "SLEEP mode" delete --(a high power mode)--.

Column 3, line 21, after "IDLE mode" insert --(a high power mode)--.

UNITED STATES PATENT AND TRADEMARK OFFICE
CERTIFICATE OF CORRECTION

PATENT NO. : 5,481,733
DATED : January 2, 1996
INVENTOR(S) : Frederick Douglis, Brian D. Marsh, and Parameshwaran Krishman It is certified that error appears in the above-indentified patent and that said Letters Patent is hereby corrected as shown below:

In column 3, delete lines 32-36 and lines 60-67, and replace with the following Table 2:

Table 2

| Mode | Power (watts) |
|---|---|
| OFF | 0.0 |
| SLEEP | 0.025 |
| IDLE | 1.0 |
| ACTIVE | 1.95 |

Power consumption of the major disk modes for the Maxtor MXL-105 III.

Column 7, line 6, before "Method" insert --"--.

Signed and Sealed this

First Day of July, 1997

Attest:

BRUCE LEHMAN

*Attesting Officer*  *Commissioner of Patents and Trademarks*